US007243351B2

(12) United States Patent
Kundu

(10) Patent No.: US 7,243,351 B2
(45) Date of Patent: Jul. 10, 2007

(54) SYSTEM AND METHOD FOR TASK SCHEDULING BASED UPON THE CLASSIFICATION VALUE AND PROBABILITY

(75) Inventor: Ashish Kundu, Mayurbhanj (IN)

(73) Assignee: International Business Machines Corporation, Armonk, NY (US)

(*) Notice: Subject to any disclaimer, the term of this patent is extended or adjusted under 35 U.S.C. 154(b) by 758 days.

(21) Appl. No.: 10/321,680

(22) Filed: Dec. 17, 2002

(65) Prior Publication Data
US 2004/0117794 A1 Jun. 17, 2004

(51) Int. Cl.
G06F 9/46 (2006.01)
G06F 15/173 (2006.01)
G06F 11/00 (2006.01)

(52) U.S. Cl. ............ 718/102; 718/103; 718/105; 709/223; 709/224; 709/225; 709/226; 370/229; 370/230

(58) Field of Classification Search ........ 718/100–108; 709/207, 229, 223–226; 705/17; 370/229–230
See application file for complete search history.

(56) References Cited

U.S. PATENT DOCUMENTS

| 5,437,032 A * | 7/1995 | Wolf et al. ............ 718/103 |
| 5,938,732 A * | 8/1999 | Lim et al. ............. 709/229 |
| 6,295,553 B1 * | 9/2001 | Gilbertson et al. ....... 709/207 |
| 6,389,448 B1 * | 5/2002 | Primak et al. .......... 718/105 |
| 2002/0107743 A1 * | 8/2002 | Sagawa .................... 705/17 |
| 2002/0186656 A1 * | 12/2002 | Vu ........................ 370/229 |

OTHER PUBLICATIONS

Bhatti et al.,"Web Server Support for Tiered Services", IEEE, 1999, pp. 64-71.*
Cardellini et al.,"Web Switch Support for Differentiated Services", ACM Sigmetrics Performance Evaluation Review, 2001, pp. 14-19.*
Aron et al., "Cluster Reserves: A Mechanism for Resource Management in Cluster-based Network Servers", AMC, 2000, pp. 90-101.*
Carlstrom et al., "Application-Aware Admission Control and Scheduling in Web Servers", Nov. 7, 2002, IEEE, pp. 506-516.*
Myongsu Choe and Carl Tropper, "Flow Control and Dynamic Load Balancing in Time Warp" Source—Internet Weblink: http://www.computer.org/proceedings/ss/0598/05980219abs.htm.
Ossama Othman, Carlos O'Ryan, and Douglas C, "The Design and Performance of an Adaptive CORBA Load Balancing Service".

* cited by examiner

Primary Examiner—Meng-Al T. An
Assistant Examiner—Jennifer N. To
(74) Attorney, Agent, or Firm—Gibb & Rahman, LLC; Andrew P. Tennent, Esq.

(57) ABSTRACT

The present invention provides a system and method for scheduling tasks in a computing system. The disclosed system model has multiple levels, with each level having at least one queue. Each queue has at least one processing function and zero or more clusters associated with it. Flow control technique is used amongst queues at various levels in order to schedule tasks efficiently such that task drop rate reduces. Based on the flow control directives, corrective actions, such as varying the dispatch rate or changing the buffer capacity of queues may be performed by a queue. The disclosed system and method can be implemented as Cooperative Load Distributor (CLD) architecture or as Cooperative Load Distributor framework.

31 Claims, 7 Drawing Sheets

| Request | Survival Probability | QoS level | Cost Factor | Utility value or modified utility value | Threshold value or modified threshold value |
|---|---|---|---|---|---|
| A | 0.75 | 1 | | 0.75 | 0.5 |
| B | 0.25 | 2 | | 0.5 | 0.5 |
| C | 0.16 | 3 | | 0.48 | 0.5 |
| C' | 0.2 | 3 | 0.9 | 0.54 | 0.5 |
| D | 0.4 | 1 | | 0.4 | 0.5 |
| D' | 0.5 | 1 | 0.9 | 0.45 | 0.5 |
| D" | 0.6 | 1 | 0.8 | 0.48 | 0.45 |
| E | 0.25 | 1 | | 0.25 | 0.5 |
| E" | 0.5 | 1 | 0.8 | 0.4 | 0.45 |

FIG. 3

SYSTEM AND METHOD FOR TASK SCHEDULING BASED UPON THE CLASSIFICATION VALUE AND PROBABILITY

FIELD OF THE INVENTION

The present invention relates to field of task scheduling in computing systems. In particular, the invention relates to methods, system and framework for task scheduling while reducing the number of requests dropped in a computing system and enforcement of Quality of Service (QoS) and Service Level Agreements (SLA).

BACKGROUND

A computing system may be defined as a system, having a memory and processing capability, which carries out various tasks and processes various requests. Such requests may range from a simple data request, such as accessing a database over a network, to more complex ones, such as a request for running an application, which, in turn, may require some data (in databases) in order to process the original request.

Any computing system that receives requests (or tasks) and processes them has certain limitation on its capacity. There is a bound on the maximum number of requests it can process simultaneously. Such a limitation may arise due to the design and capacity of the computing system. Thus, parameters such as CPU speed, memory capacity, network connection speed etc. on which the system is deployed—limit the number of requests that can be handled by the system. Therefore, if the number of requests exceeds this limit, there will be certain requests that will not be completely processed. There will be some requests that will be dropped before reaching the computing system. These requests will not be received by the computing system at all. Also, there will be some requests that will be received by the computing system, but these will only be processed partially before they are aborted. This usually happens due to lack of memory or timeout of a network connection.

One example of such a system may be an Internet-based online stock trading service. Such a service provides information about the prices of specific stocks to its users on user's requests. However, with growing number of users of such online Internet services, the number of user requests handled concurrently by a server of the online Internet service becomes unmanageable some times. For instance, server of an online Internet service, which provides specific information about basketball, gets overloaded with user requests during the finals of a national level basketball tournament. Indeed, there would be some user requests that will only be partially processed, and some requests that will not be processed at all due to the overload of requests. These requests, which are not processed completely, or not processed at all are also regarded as dropped.

The request is regarded as dropped in case any transaction that is critical for the complete processing of the request itself is unprocessed. Suppose a request B generated by partial processing of a request A is critical for complete processing of request A. However, if request B is dropped (say, due to overload of requests on component that processes request B), request A cannot be completely processed. In such a case, request A is regarded as dropped as well.

Thus, to summarize, a request is regarded as dropped if (i) prior to the processing —partial or full—of the request by the system or a system component, it is eliminated from any future consideration for processing (i.e. is completely dropped) due to request overload on the component; (ii) any transaction that is critical for the complete processing of the request is aborted; (iii) another request, which is generated out of the processing of the original request and whose complete processing is critical for the complete processing of the original request is dropped.

One way of addressing the problem of request drops due to overloading is to use multiple replicas of the same system (i.e. multiple servers) to process incoming requests. Thus, a cluster of servers may be used instead of a single server to process the requests. A load balancer is used in front of the cluster to receive requests and ensure fair distribution of requests among the replicas. Load balancers are hardware devices or software programs that distribute user requests evenly among various components of the cluster in order to prevent overloading of components. For instance, a load balancer may be used to distribute user requests among a number of replicas of a server (such as http1 servers). This distribution may be based on predefined criteria, such as workload on each component, content type of the request (video or text), geographical location of components and expected QoS and SLA. Furthermore, there may be pre-defined method/technique of distributing these requests among similar components as will be discussed later.

With use of multiple instances of same server, there is a reduction in the number of requests processed by each server. This, in turn, reduces the chances of overloading of a server. However, the number of requests in certain cases may be so high that it would be impractical to have multiple servers to meet the requirements. With increased network transmission speeds and increased number of users/clients, the transmission of requests over a network is much faster than the rate of processing requests at a component and/or the rate of forwarding request by a load balancer. This causes an accumulation of requests at a component/load balancer and thus overloads the component/load balancer. This leads to request drops at the component/load balancer. In some other cases, a component starts processing a request, but due to high load conditions, the processing does not complete within a pre-defined period. This may also lead to request drops.

Request drops adversely affect the performance of a computing system. First, there is wastage of resources—resources of load balancer(s) that processed and forwarded the request and/or resources utilized for the partial processing of the request. This leads to reduction in resource utilization. Second, a request, upon being processed, may result in a change of state in some of the components (that have processed the request). If the request is dropped at an intermediate component, the system may have to be rolled back to its most recent consistent state. In other words, the whole system has to be brought back to the state that the system was in, before the processing of the dropped request had started. Each rollback worsens the response time of the system in processing requests, reduces the throughput of the system and also wastes system resources. Third, wastage of system resources may cause dropping of other requests, which otherwise could have been processed, due to non-availability of sufficient system resources. Fourth, for the same reason as stated above, some other requests would be processed with a lower quality of service, which otherwise could have been processed at a better quality of service. Fifth, the time wasted for partial processing of a dropped request adds to the user response time for dropped or failed requests. This may hamper the Quality of Service (QoS) provided to the user and may also lead to the violation of Service Level Agreements (SLA) between the user and the network. Finally, user dissatisfaction increases with higher response time for processing of requests.

In light of the abovementioned disadvantages of request drops, it is imperative to reduce the number of request drops. There are a number of methods and techniques to use load balancers in order to reduce the request drops. One exemplary method for carrying out the distribution of user requests by a load balancer is the Round Robin Domain Name Server (RR-DNS) approach. In this method, the requests are routed to multiple servers one by one on a rotational basis (that is in a round robin fashion).

There are some other load-balancing solutions that are based on the idea of flow of information among individual components in a cluster (of similar components) in order to determine the target component for a particular user request. This information may relate to the load levels of each component in the cluster whose load is being balanced by the load balancer.

One such solution is disclosed in U.S. Pat. No. 5,938,732, titled "Load balancing and fail over of network services". It deals with maintenance of communication within a cluster of components and coordination of the cooperation amongst them. This is done to ensure that the service provided by that group remains available, even if one or more components providing the service become unavailable from time to time, such as through failure. Each processing element periodically sends a control message to all other processing elements within the group helping to maintain the communication. This message consists of the status of the sending components as well as data about the perceived status of the other components within the group.

Another solution has been proposed in research paper titled "Flow Control and Dynamic Load Balancing in Time Warp" authored by Myongsu Choe and Carl Tropper. It discloses an algorithm that integrates flow control and dynamic load balancing. Flow control is employed by processors in a cluster (of processors) to share or distribute the load amongst them. Flow control in this case is among the target components.

The research paper titled "The Design and Performance of an Adaptive CORBA Load Balancing Service" authored by Ossama Othman, Carlos O'Ryan, and Douglas C. Schmidt also proposes a solution. This paper, in its future works, raises the need to employ flow control among various load balancers to determine the target replica (component) from a given cluster (of components).

All the solutions described above use information exchange among various components in a cluster (of similar components) to determine the target component that would process the request(s). However, none of them address the problem of request drops in systems that intend to work at high request rates. Requests that are finally dropped before their completion are also processed, thereby causing wastage of resources and increasing the processing time and power consumption. This results in lower system efficiency. These solutions also have the usual disadvantages of request drops that have been described above.

Therefore, in light of the discussion above, there exists a need for a system and method that can reduce the number of request drops in a computing system. More specifically, there is a need for a system and method for reducing the number of requests dropped at the load balancers. There also exists a need for a system and method for facilitating Quality of Service (QoS) and Service Level Agreements (SLAs) enforcement at load balancers. There also exists a need for a load-balancing framework for increasing the throughput of system. This is required for reducing the wastage of system resources.

SUMMARY

An object of the present invention is to schedule requests in a computing system.

A specific object of the present invention is to reduce the number of requests dropped at intermediate components and at the load balancers of the computing system.

Another specific object of the present invention is to enforce Quality of Service (QoS) and Service Level Agreements (SLA).

Another specific object of the present invention is to provide a system and method, within a load balancer, for processing flow control messages and for enforcing QoS/SLA.

Another specific object of the present invention is to increase the request throughput of load balancers as well as that of the system.

Yet another object of the present invention is to maximize system resource utilization.

Yet another object of the present invention is to provide differentiated distribution of request.

Yet another object of the present invention is to minimize the number of system rollbacks.

Yet another object of the present invention is to reduce response times to the user.

These and other objects of the present invention are provided by methods, systems and computer program products, which balance the load amongst a set of replicas. The method aims at scheduling requests (arriving at a computer system) on the basis of the implemented policy. The computing system comprises a plurality of levels, each level having at least one queue, each queue having at least one buffer and each queue relating to at least one processing component. Each queue may also correspond to any number (zero or more) of clusters associated with it. The incoming request is processed through one or more levels before being completely processed. Flow control information is exchanged between two levels in order to reduce request drops. In one embodiment of the present invention, an implementation of the above method within a load balancer has been described. The incoming requests are stored at a first level queue. The requests are further classified into a plurality of classes based on user-defined parameters (such as QoS/SLA). The requests are then forwarded to one of a plurality of second level queues based on predefined criteria. For instance, each second level queue may correspond to a class of requests. There exists flow of control information between the two levels of queues. This control information is used to forward a request to an appropriate second level queue based on the states of the second level queues, thereby reducing the number of requests dropped in the load balancer.

In another embodiment of the current invention, the above-mentioned load balancers can be used in a framework to dynamically balance load amongst a plurality of clusters. The incoming requests are received at the first level load balancer. The load balancer dispatches a request or a number of requests concurrently to target components based on the type of request and/or state of the target component. A load balancer generates flow control messages as and when it senses that there is going to be a request drop and sends these messages to previous-level load balancers. Upon receiving a flow control message, a load balancer may decide to take corrective actions so that request drop in later levels is avoided. The load balancer can also generate flow control message that can be exchanged with its previous level and next level load balancers.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which:

FIG. 3 shows a table that is used for illustrating the calculation of utility value with the help of an example;

DESCRIPTION OF PREFERRED EMBODIMENTS

Terminology Used

Logical Instance: A logical instance is either a physical instance/component or some capacity of a physical instance/component. A logical instance may be represented by a pair—name/address of physical instance and capacity allocated in the physical instance. All use of term "instance" and "replica" in this application is synonymous to "logical instance".

Cluster: A cluster is a collection of logical instances that are identical in terms of functionality supported, protocol for using the instance etc.

Next-level load distributor: A next level Load Distributor (LD) of LD-x is an LD that is adjacent and topologically next to LD-x. For example, in FIG. 6, LD 606 and LD 608 are next-level LD's of LD 602; LD 614 is next-level LD of LD 606 and LD 608.

Previous-level load distributor: A previous-level load distributor of LD-x is an LD that is adjacent and topologically just previous to LD-x. For example, in FIG. 6, LD 602 is previous-level for LD 606 and LD 608; LD 606 and LD 608 are previous-level LDs of LD 614.

Front-end: A front-end is a cluster of application instances that receive requests from end users.

Request Classification Factor (RCF): RCF is used to classify a request (differentiate from other requests) into a category. For instance, an embodiment of the present invention may use customer identity or service class/grade associated with the request or a combination of customer ID and service class of a request as RCF to classify incoming requests. Other parameters that can be used to calculate RCF values may be request type (e.g., catalog viewing requests, shopping requests, etc.), request complexity, request priority, etc.

Load Monitor: A component M that is associated with a system or another component C such that M is capable of monitoring the state of C and/or load on C at a given point of time. States of C include availability, response time, CPU consumption etc. Load on C is a measure of the consumed capacity of C or that of the underlying system that deploys C.

Resource Manager: A component R that is capable of allocation/de-allocation of resources from one consumer to another and/or capacity planning of the system it is associated with.

The present invention provides a model (system and method) that uses flow control techniques in order to minimize request drops. The scheduling of requests can be carried out using existing policies/techniques. For the sake of illustration in this application, we take a simple and common example of such a policy, which is: forwarding the requests that have a high utility value, the utility value of a request being determined by the probability of a request being completely processed, and by the priority (also called request class) of the request. This example is explained in greater detail later in conjunction with FIG. 3. It will be apparent to one skilled in the art that there may be numerous such policies that may be implemented/followed in order to reduce request drops.

Figure 1:
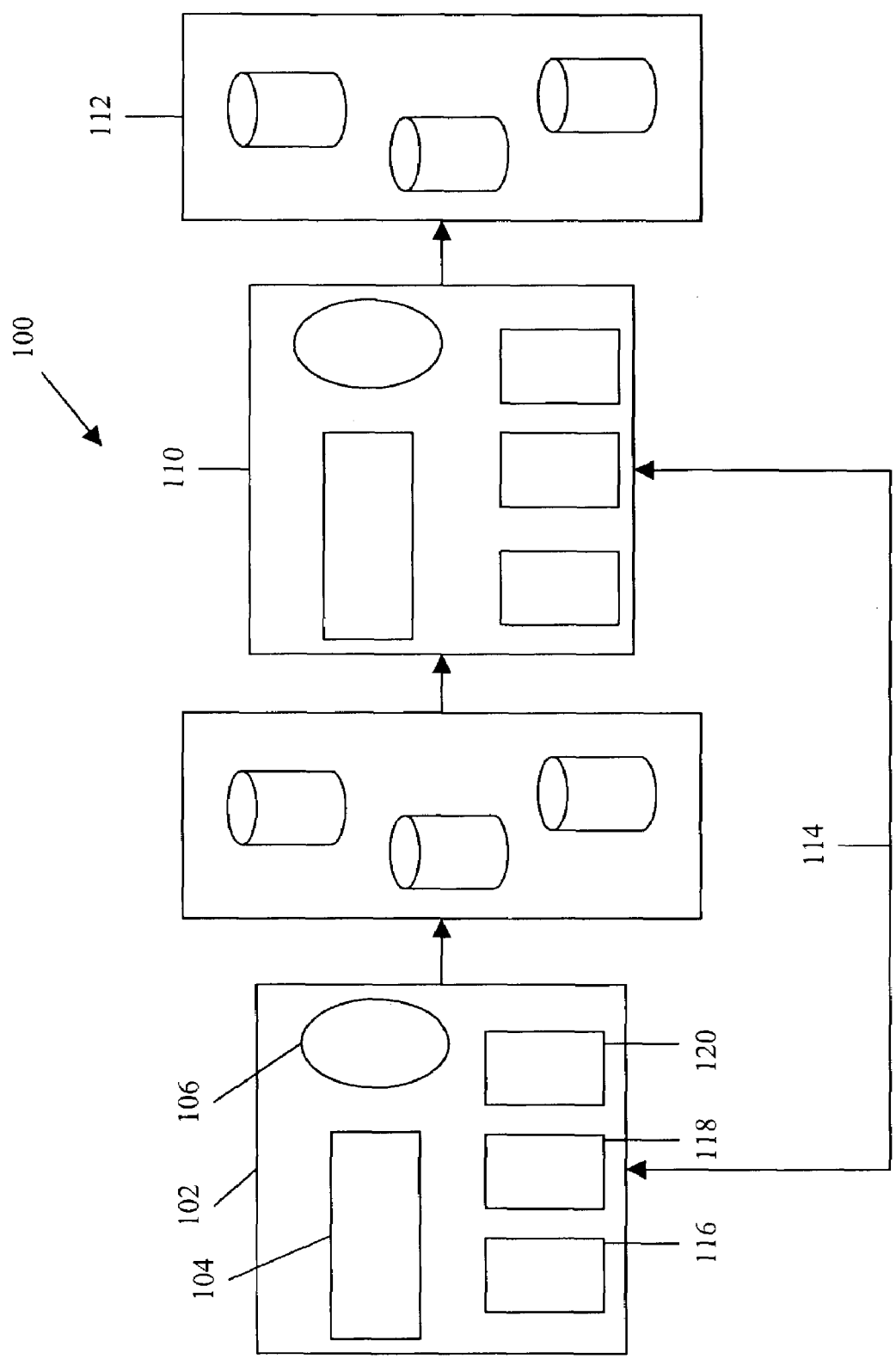
FIG. 1 shows an example of the system for processing requests in accordance with a preferred embodiment of the present invention.

FIG. 1 shows a computing system 100 for processing requests in accordance with a preferred embodiment of the present invention. System 100 may have one or more levels, with each level having one or more queues in it. Queues at each level may further have one or more buffers and one or more processing functions associated with it. For the sake of illustration, FIG. 1 illustrates only two levels (viz. 108 and 112) of the computing system. Also, for the sake of illustration, FIG. 1 shows each level having only one queue (i.e., 102 and 110) in it. Also, each queue is shown to have only one buffer (i.e., 104 and 122).

Broadly, the manner in which a request is processed in system 100 is as follows: Queue 102 includes a buffer 104 and a processing function 106 associated with it. Buffer 104 in queue 102 receives the incoming requests and forwards these incoming requests to processing function 106. Processing function 106 may be a request dispatching function (used for dispatching the request) or a request classifying function (used for classifying the requests). For the sake of illustration, FIG. 1 shows queue 102 in which processing function 106 is a request dispatching function. A queue can have any number of clusters associated with it. Optionally, the queue may not have any cluster associated with it. In such a case, one queue may be followed by another queue with only the last queue having a cluster associated with it. The cluster consists of component instances that carry out equivalent tasks. For the sake of illustration, FIG. 1 shows queue 102 associated with a cluster 108, which is actually a cluster of components that carry out request execution functions. Request dispatching function dispatches the request to cluster 108, which, in turn, may process and forward the request to a next level queue 110. Each queue preferably also contains an exchanging module 116 for exchanging process control/flow control messages from previous-level/next-level queues, an implementing module 118 for implementing directives of flow control messages, and a sensing module 120 for sensing when to create and send control/flow control signals. Note that an implementation of such a model may not necessarily have all three modules distinct. An implementation, for instance, may have only one module that performs the functions of all three modules. However, the functions of all three modules need to be carried out in any implementation. The use of these modules is explained in greater detail later in the application. Queue 110 also has a buffer and a request dispatching function. The request dispatching function dispatches the request to a cluster 112 that is associated with queue 110. The components of cluster 112 process the request appropriately. Note that there may be a case wherein requests from cluster 112 are forwarded to more than one queues depending on the processing requirements of the request. This information (about processing requirements) may be stored in the header of the request and is accordingly processed by components of cluster 112 in order to determine the target queue.

In the disclosed system, there is flow of information (messages) between queues at different levels. In other words, queues 102 and 110 exchange information 114. As already mentioned, exchanging modules of these two queues exchange information 114 in order to enable queue 102 to take corrective actions to reduce request drops based on some criteria. Buffer management policy can be used to carry out corrective actions completely or partially. One simple example of buffer management policy is described below for the sake of illustration.

An example of buffer management policy can be the following: Requests are classified (or dispatched) and forwarded to next level in FCFS (First-Come-First-Serve) basis. The queue determines a probability of survival of a request at next-level queues based on the flow control information. Each queue in a level is able to send flow control signals to its previous-level queues and control signals to its next level queues. This information may relate to the load information corresponding to the survival probability of the request at queue. Using this probability and the priority of the request, it determines a utility value of a request. [to be explained in detail in conjunction with FIG. 3]. If the number of incoming request is more than the request handling capacity of the queue, the queue may decide to receive requests of higher utility value and drop other requests. It may also organize the requests that could not be forwarded to a next level queue in a hash-table, so that they can be forwarded as soon as the next level queue becomes ready to receive requests.

In order to reduce request drops, a queue may execute several corrective actions. These corrective actions are described in detail in conjunction with FIG. 2. These corrective actions are executed by implementing module 118 and result in a significant reduction in the number of requests dropped. Also, in a preferred embodiment of the invention, these actions result in a strict enforcement of QoS/SLA standards.

Figure 2:
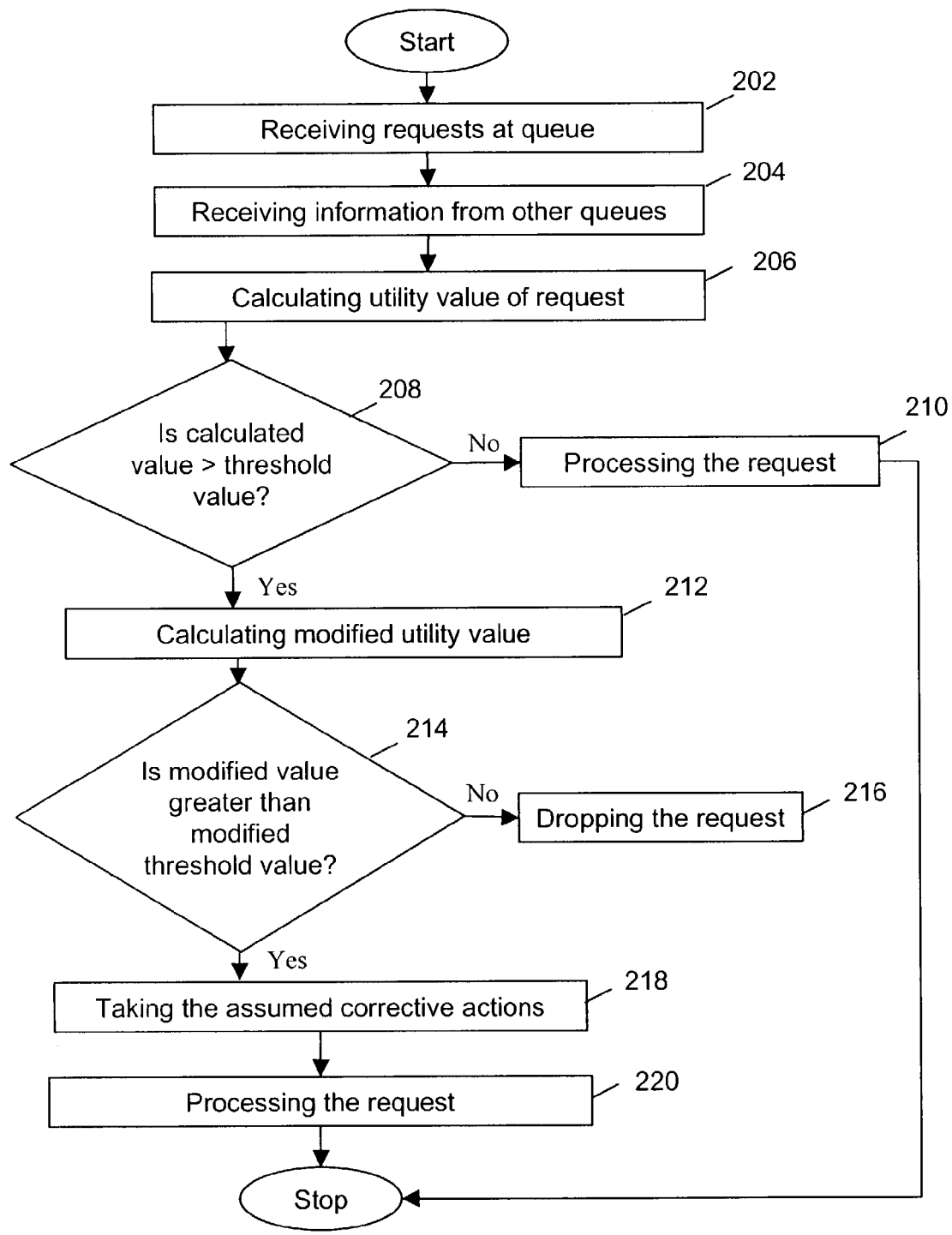
FIG. 2 is an example of the sequence of steps that are followed to process a request in accordance with the preferred embodiment of the present invention.

FIG. 2 is a flowchart that illustrates the sequence of steps that are to be followed to process a request in accordance with a preferred embodiment of the present invention. It may be noted that in the following description, the example of utility value of a request is used only to illustrate the working of a preferred embodiment of the present invention. The following description, in no manner, should be considered as limiting.

At step 202, queue 102 receives the request and stores it in a buffer. At step 204, exchanging module 116 of queue 102 receives information 114 about load on queue 110 and that on cluster 112. At step 206, implementing module 118 of queue 102 calculates the "utility value" of forwarding the request to cluster 110 on the basis of information 114, and optionally, information relating to the request (that may be stored in the request header). For the sake of illustration, let us assume that the utility value is dependent on probability of completion of the request, which in turn may be based on load on subsequent level queue and clusters. Higher the load on next level queue and corresponding clusters, lower is the probability of completion of the request, and thus, lower is the utility value of the request. This is so because if a request with low probability of completion (say 0.05) is forwarded by queue 102, it utilizes processing time and system resources of queue 102. It is very likely (with a probability of 0.95) that this request will be dropped subsequently (at queue 110), thereby wasting the system resources and time. Utility value may also be based on the request class. For instance, forwarding a QoS/SLA level gold request is commercially more useful than forwarding a QoS/SLA level bronze request. It is apparent to one skilled in the art that there may be numerous other factors that may be introduced in order to determine utility value of the request. However, for the sake of illustration, we have limited the utility value of the request to include its probability of completion, which may be calculated using information 114, and the request class, which may be obtained from the header of the request packet. The calculation of utility value in accordance with this illustration is explained in greater detail (using an example) in conjunction with FIG. 3.

At step 208, the calculated utility value of the request is compared with a threshold utility value that has been assigned to queue 102. A threshold utility value is calculated and assigned to each queue. This threshold value is fixed for a particular queue. This threshold value is calculated by using information about estimated load on next level queues and corresponding clusters, and by considering the request classes that are to be handled by the queue. This value has to be changed on every subsequent scaling up or scaling down in the system, or for changes in the request classes that are to be processed by the queue.

If the calculated utility value is greater than the threshold utility value, then, at step 210, the request is processed (dispatched or classified) by processing function 106 of queue 102. However, if the calculated utility value is less than the threshold utility value, then, at step 212, the sensing module of queue 102 calculates a modified utility value of the request. The modified utility value is calculated after presuming that the queue takes some corrective actions (in order to increase utility value of the request). This value is based on the cost of taking corrective actions. The cost, in turn, is primarily governed by memory consumption and processing power usage for taking corrective action. The utility value can also be based on the probability of completion of the request after corrective actions have been taken as also the class of the request.

The corrective actions taken by the queue may be the following. First, sensing module of the queue may send control signals to change its request dispatch rate so that the load on next level queue and corresponding cluster reaches an optimal level. If the request had low utility value earlier due to overload on next level queue, the control signals will reduce the load and, hence, increase the probability of completion of the request. This, in turn, results in an increase in the utility value of the request. The cost associated with this action is typically very low as this action may only involve executing a small code. Thus, the modified utility value of the request is, typically, higher than the original utility value of the request (due to increase in probability of completion). The steps involved in taking this action are explained in greater detail in conjunction with FIG. 4. At step 214, the modified utility value is compared with the modified threshold utility value. Note that the modified threshold utility value will be same as the original threshold utility value in case no scaling up is performed (i.e. if the second action is not performed). If the modified utility value is less than the modified threshold value, then at step 216, the request is dropped. Else, at step 218, the corrective action assumed in step 212 is taken and the request is dispatched by the queue to its cluster, which, in turn, may be forwarded it to the next level, at step 220, after appropriate processing.

In order to illustrate the concept of utility value, threshold utility value, modified utility value and modified threshold utility more clearly, consider the table shown in FIG. 3. Note that the described way only intends to serve the purpose of illustration, and in no way should it be considered as limiting the invention. For the sake of simplicity, let us take an example of a very simple way of calculating the utility value: multiplying the survival probability (which lies between 0–1) with the QoS level (1 for bronze request, 2 for silver request or 3 for gold request). Thus, request A (say a bronze request) having a survival probability of 0.75, will have a utility value of 0.75*1=0.75. This request will be dispatched by the queue as its utility value exceeds the threshold utility value (=0.5 for the queue). Similarly, request B shown in FIG. 3 will also be dispatched. However, request C having utility value of 0.48 (gold request (QoS=3) with completion probability of 0.16) will not be forwarded, as the threshold utility value (0.5) is higher. A modified threshold utility value is calculated by assuming that a corrective action of changing the dispatch rate of the load balancer is taken. The steps of this corrective action are explained in FIG. 4. Request C' is the modified request. FIG. 3 shows that if corrective action of modifying the dispatch rate is taken, completion probability goes up to 0.20. However, there is a cost factor (say, 0.9, for example) associated with the action. Thus, the modified utility value for request C' comes out to be 0.2*3*0.9=0.54, which is greater than threshold utility value 0.5. Thus, taking the corrective action increases utility value of request C, thereby eliminating the need to drop it.

Still referring to FIG. 3, consider the case of request D (completion probability=0.4, QoS level=1 (bronze)). Even after assuming that first action is taken, the modified utility value (0.45) does not exceed the threshold utility value. However, assume that second action (of scaling up) is taken. Cost associated with this action is higher (multiplication factor of 0.8) than that of first action (multiplication factor of 0.9). Thus, the modified utility value comes out to be 0.6*1*0.8=0.48. But, in this case, the threshold utility value is also reduced (due to scaling up) to 0.45. Thus, request D can be passed if second corrective action is taken. However, there can exist a request, such as request E, which do not pass even if both the corrective actions are taken. Such requests are dropped by the system.

Figure 4:
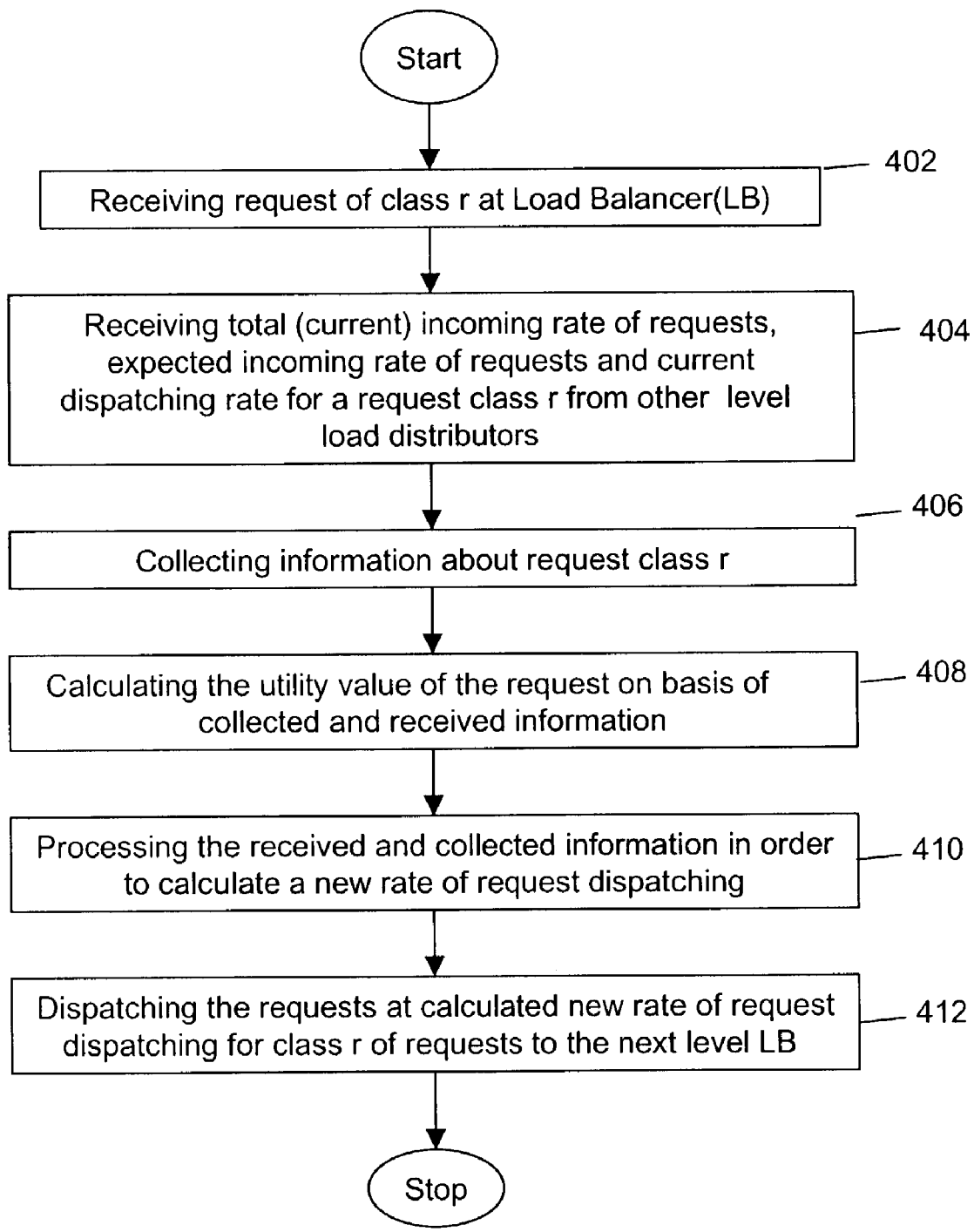
FIG. 4 shows a sequence of steps in an exemplary case wherein the request becomes passable after modifying the request dispatch rate of the load balancer.

FIG. 4 shows a sequence of steps in an illustrative case wherein the queue is embodied in a load balancer and the request becomes passable after modifying the dispatch rate of a load balancer. Again, there are numerous ways of making the request passable and the following description illustrates one possible way of it. The information used in this action includes the information about load on the next-level load balancers and their corresponding clusters. At step 402, the queue receives a request of a particular request class r. At step 404, the exchanging module of the queue receives information about current incoming rate of requests for request class r, expected rate of incoming requests for request class r and the current dispatching rate of requests of request class r from the next level load balancer. The probability of completion of the request is determined by processing this received information at the implementing module of the queue. The probability can be calculated in a number of ways. One exemplary way of calculating the probability is explained in conjunction with step 410.

At step 406, the queue collects information about the request class. This information is preferably stored in the header of the incoming request. QoS/SLA level of the request may be one such example of the request class. A simple implementation example may be assigning value of 3 for gold requests, 2 for silver requests, and 1 for bronze requests. At step 408, the queue calculates the utility value of the request on the basis of information collected in steps 404 and 406. Again, as already mentioned, there may be numerous ways in which this information may be used by the queue to obtain the utility value. As described, one simple example of doing so is by multiplying probability of completion and the request class level. Thus, if load on the next level load balancer is 75% (completion probability=0.25), then the utility value for a bronze request is 0.25 (and that of a gold and silver request is 0.75 and 0.5, respectively).

Assume that the utility value of the bronze request is less than the threshold utility value. In such a case, the modified utility value is calculated by assuming a change in request dispatching rate of the queue. At step 410, the change in the request dispatching rate is calculated by the implementing module of the queue using the information collected. Any technique can be employed to calculate the dispatch rate. Following is a simple illustrative way of calculating the change in dispatch rate on the basis of survival probability of a particular request class (This example does not take into account the priority (request class) of the request. It is obvious to one skilled in the art that there are a number of ways in which dispatch rates may be calculated with or without accounting for the request class.) Finally, the requests are dispatched at the calculated new rate of request dispatching at step 412.

Consider a queue Q-m having previous level queues as Q={Q2, Q3, Q4, ... Q-k}. If the buffer of Q-m is more than a critical value for a request class—r (say 95% full), then queue Q-m decides to generate a flow-control message for queues in Q. The flow control message contains the incoming request rate at Q-m for class r: $R_r^m$. the expected incoming rate is $E_r^m$. The receiving queue Q-k processes the message and decides to correct its dispatching rate. The action implemented by Q-k is to reduce the dispatching rate. An example of formula used to compute the final dispatching rate $d_r^k$ may be following:

Let $D_r^k$ be the current dispatching rate of requests of class r from CLD-k.

Ratio of contribution to incoming rate $C=D_r^k/R_r^m$.

Change to dispatching rate $z_r^k=C*(E_r^m-R_r^m)$.

New dispatching rate $d_r^k=D_r^k+z_r^k$.

If $d_r^k<D_r^k$, then Q-k reduces dispatching rate for request class-r to $d_r^k$. This is achieved by adding delays after each request that are to be dispatched to implement the new dispatching rate.

The model (system and method) disclosed also has the ability to classify and process requests on the basis of some pre-defined parameters (such as Quality of Service/Service Level Agreements (QoS/SLA)). The use of present invention significantly reduces the number of request drops occurring in a system. Also, the system resource usage is much more efficient as the chances of a request getting dropped at intermediate components in a computing system is reduced. An embodiment of the present invention also ensures the enforcement of strict Quality of Service/Service Level Agreement (QoS/SLA), thereby resulting in an improved quality of service. This ensures faster response time to user requests.

The hardware implementation of the heretofore-described system can be done in the following manner. Each queue can be implemented by an integrated circuit. The buffer may be implemented using DRAM technologies or technologies that are used to implement cache memory for faster memory operations. The sub-component that processes the flow control messages can comprise of a microprocessor, a memory and a communication processor as well. The processing function can be implemented as a microprocessor with some memory and a communication processor as well. There are communication links between the buffer, processing function and the controller. Each sub-component can be programmed through specific instruction set for configuration and behavior desired.

The described system can also have a software implementation, which, in turn, may be implemented on a computing device having a memory and a processing capability. Each component can be implemented in the form of a software code that is written using any of the common programming languages (such as C, C++ or JAVA). These software codes, upon execution, use memory and processing power of the computing device in order to carry out the functionalities of the component.

Figure 5:
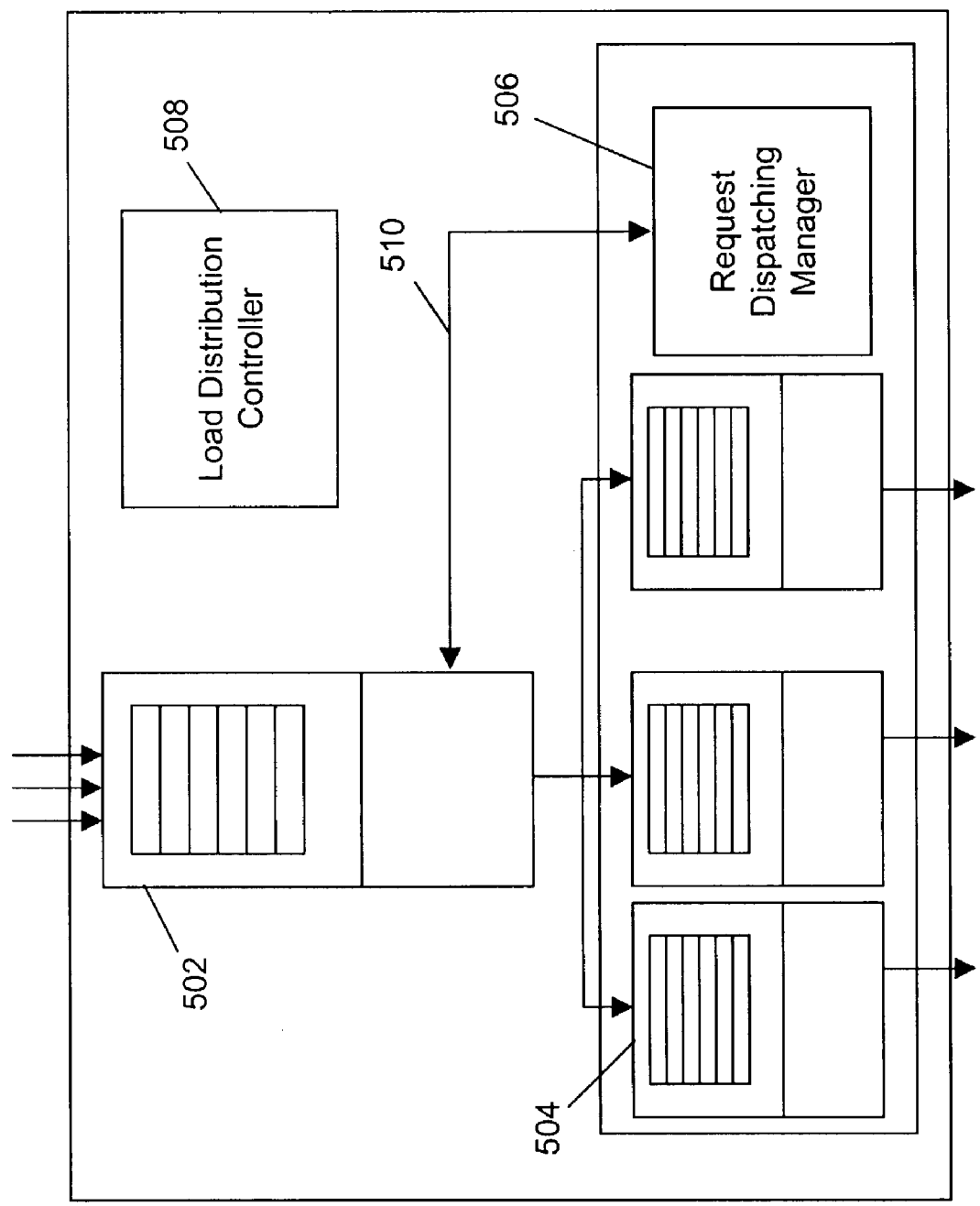
FIG. 5 illustrates the overall system architecture of a Cooperative Load Distributor (CLD) that is based on the idea of flow of information for reducing the number of request drops.

The heretofore mentioned model can be implemented in a Cooperative Load Distributor (CLD) architecture, as will be described in conjunction with FIG. 5. This model may also be implemented in a cooperative load distribution framework, which uses a number of such CLDs, (as described in FIG. 5). Such a framework is explained in greater detail in conjunction with FIG. 6.

Implementation-1: Cooperative Load Distributor (CLD)

The implementation of the heretofore-described model as a CLD has n-levels of queues, where n>=1. None of the first (n−1) levels have a cluster associated with it. The processing function of each queue in these levels is a request classifying function. The $n^{th}$ level has one or more clusters per queue and the processing function for these levels are request-dispatching functions.

The implementation of heretofore-discussed model is now described by using an example. FIG. 5 illustrates an example of the overall system architecture of a Cooperative Load Distributor (CLD) 500. CLD 500 includes two levels of queues; a first level queue (Global Request Handler (GRH) 502) and second level queues (Specific Request Handler (SRH) 504). GRH 502 does not have any cluster associated with it, and the processing function for GRH 502 is a request classifying function (also called Request Classifier (RC)). RC classifies requests on the basis of a Request Classification Factor (RCF), which, in turn, may be dependent on certain predefined parameters (such as service based classification or customer based classification as will be explained later). There are several SRHs (second level queues) (like SRH 504) that receive the classified requests from GRH 502. These SRHs may correspond to various classes of requests. In the illustrated example, each SRH has a request dispatching function (also called Request Dispatcher (RD)). Each SRH may have one or more cluster, to which the SRH dispatches the request. Note that although the CLD embodiment of the current invention has been described in conjunction with two levels of queues, multiple level of queues can also be used. For instance, there may be sub-classification of requests at the second level queue. An exemplary embodiment of the load balancer with three levels can have one first-level queue acting as a global buffer, several second level queues for different service classes; and several third level queues for different customer classes.

CLD 500 has a Request Dispatch Manager (RDM) 506 and a Load Distribution Controller (LDC) 508 that carry out the functionalities of sensing module, exchanging module and implementing module. Note that in this implementation, the exchanging module, sensing module and the implementing module are not illustrated to be queue-specific, i.e. each queue does not have these three modules. Instead, there is only one RDM and one LDC, in this exemplary CLD architecture, which embody the functionalities of these modules. RDM 506 acts as a sensor of the load states of SRH 504 and enables exchange of messages between GRH 504 and SRH 502. RDM 506 sends appropriate messages to GRH when SRH reaches near-full state (as will be explained in detail later). RDM also 506 exchanges information with Load Monitors (LM) in order to gain dynamic load information about each replica. LDC 508 receives, generates and sends messages to other CLDs (as will be explained in conjunction with FIG. 6). LDC 508 also exchanges information with Resource Managers (RM).

The CLD architecture is now described in greater detail. As already mentioned in conjunction with FIG. 5, CLD 500 has the following components: Global Request Handler (GRH) 502, Request Dispatching Manager (RDM) 506, Specific Request Handler (SRH) 504 and Load Distribution Controller (LDC) 508. GRH 502 includes a buffer, a request receiver, and a request classifying function. RDM 506 includes receivers of messages from LDC 508, GRH 502 and senders of messages to SRH 504, LDC 508 and GRH 502. RDM 506 enables the exchange of messages 510 between SRH 504 and GRH 502. It also contains, optionally, a load receiver and a message sender for load monitors. SRH 504 includes a request receiver, a buffer called second level buffer (SLB) and a request dispatching function. LDC 508 includes a module that modifies the configuration of CLD dynamically based on a new request class, or based on any change in the cluster capacity etc. LDC 508 also includes an optional module to implement any QoS/SLA related intelligence. For instance, it can decide the buffer sizes per QoS class based on their frequency of becoming full, rates of request drop etc.

GRH 502 is the first level queue and a set of SRHs comprise of the second level queues. The number of SRHs is governed by the number of request classes. In a preferred embodiment, their number is equal to the number of request classes. GRH 502 is primarily responsible to receive incoming requests, optionally carry out admission control based on authentication of the legitimacy of the requests/any other defined criteria, accept the request, and then classify each request and send the request to an SRH appropriate to the class of the request. Each SRH 504 is primarily responsible to receive requests from GRH 502 and buffer them in its buffer, if it is not full, or else selectively drop the request (in accordance with the buffer management policy as already described in the description of the model earlier), and then dispatch each request based on the load balancing technique used. GRH 502 and RDM 506 have to carry out flow control in order to implement flow control among GRH 502 and each SRH 504. RDM 506 is responsible to carry out management of SRH 504 and dispatching rate of each of SRH 504.

As and when GRH 502 receives a request, it checks if its buffer is full or not. If it is full, LDC 508 instructs GRH 502 to selectively drop the requests based on its utility value or else accepts the request. As already described, the buffer management policy that is being implemented governs the manner in which requests are to be handled on the basis of their utility values. An exemplary way of handling the request may be that the queue may receive requests of utility value higher than a threshold utility value and drop other requests. It may also organize the requests that could not be forwarded (due to low utility value) to a next level queue in a hash-table, so that they can be forwarded as soon as the next level queue becomes ready to receive requests. After accepting the requests, GRH 502 buffers the request in global request buffer. Request classifying function of GRH 502 classifies requests in the buffer and dispatches them to their proper SRH on the basis of their RCF. In order to classify application-level requests (if the load balancer is doing application level load balancing), the request classifying function of GRH 502 parses a request header of the request in order to determine the request classification factor (RCF). If the load balancer is doing network-level load balancing, then request classifying function of GRH 502 parses the IP packet header for its priority and/or other information (dependent on what kind of RCF is used) and determines the RCF.

The RCF may be computed by GRH 502. Based on RCF, GRH 502 checks the state of next level buffer B with related to the RCF value. If buffer of SRH 504 is full, then the buffer management policy of GRH 502 decides how to handle that request. SRH 504 may also be instructed by LDC 508 to drop some requests that it receives based on the utility value of the request. Else after determining the RCF, request classifying function of GRH 502 hands over the request to the appropriate SRH.

SRH 504 buffers the request to the queue. Simultaneously RD of SRH receives the load information for each replica in its target cluster. If the load balancing technique is static one (e.g. round robin load balancing techniques), no load information is effectively necessary. However, if it is a dynamic load balancing technique, then request dispatching function may require the load information on each replica on the cluster for the specific request class (to which SRH belongs). This load information is received from the load monitor(s). Note that there are two possibilities for request dispatching: first, for each request, load information for each replica in target cluster is obtained and corresponding utility value is calculated. However, in high request density networks, the request dispatching rate is far too greater than the rate at which asynchronous flow control messages are obtained. In such cases, load information is received on a predefined basis. For instance, this information may be received only when there is a significant change in the load of replicas in the concerned cluster. Request dispatching rate in such cases is calculated based on the available load information. Only when there is a significant change in the load of the cluster, the new load information is obtained and used for calculation of utility value. We have described the former way of dispatching the requests in the described embodiment. However, it will be apparent to one skilled in the art that the latter way and numerous other ways may also be used to achieve this purpose without deviating from the spirit and scope of the invention.

In a preferred embodiment, based on the received load information, RD identifies the least loaded replica and whether that replica has positive residual capacity i.e., if the replica can handle more requests. Then RD retrieves a request from the buffer and dispatches it to that (least loaded) replica. RD continues the dispatching based on a dispatch rate.

RD of each SRH 504 dispatches requests to the target replicas (clusters) based on the load balancing technique used. Request dispatching function needs to know how to dispatch the request to a target replica. Since request dispatching techniques used is different in network level and application level load balancing, request dispatching function may also be separately implemented for each of them. For application load balancing, request dispatching varies from one application to another depending on the protocol used by each of them. Thus, for a class of applications there will be only one implementation of request dispatching function.

Since RC in GRH and RD in SRH are dependent on whether the CLD is being used for application level load balancing or network-level load balancing, they can be implemented as pluggable components for the load balancer. Such a pluggable components would be used by the load balancer during its start-up. This component is application-dependent for application-level load balancing.

RDM 506 keeps track of the state of load in each SRH 504. As and when an SRH becomes near-full (for example, 75% full, this can be defined by the user), RDM 506 sends a flow control message to GRH 502. (Near-full state is always less than or equal to the full state of a buffer. Near-full state is useful as, by the time GRH 502 enforces flow control, GRH 502 might have sent out some more requests for the specific request class). The flow control message includes the request class and the incoming request rate for that request class among other things. GRH 502 might stop forwarding requests or reduce the rate at which it is dispatching requests or can take some other measures, which have been described earlier in conjunction with the model. As and when an SRH state returns to 'not near-full' state from 'near-full' state, RDM 506 sends out a message to GRH 502 about the state change. GRH 502 may then go back to its earlier state. As and when buffer of GRH 502 becomes near-full or GRH 502 observes that some SLB is becoming near-full more frequently or GRH 502 is dropping requests as GRB is full or incoming request rate is much higher than the rate at which it dispatches them to SRHs 504 or similar situation arises, GRH 502 sends a control message to LDC 508 about the state. This message contains, relevant data and may include incoming request rate, request classifying rate, request dispatching rate of SRHs etc. LDC then decides whether to increase the buffer sizes of GRB/SLBs and/or to send a flow control message to its previous-level load balancers.

LDC 508, upon receiving a flow control message for a request class r, decides how much to reduce the dispatching rate for r, how much time to stop dispatching requests for r, how much increase in buffer size (of GRH and SRH for request class r) to be made (in order to handle requests that will be buffered due to these two previous decisions). If it does not know the latest request dispatching rate for r, then it may ask RDM through a control message for that value. It will compute the values and its decisions and then direct RDM to implement the final request dispatching rate, the time for which request dispatching to be stopped and/or increase in SLB size. Similarly, if there are any directives regarding this for GRH 502, LDC 508 directs it also. RDM 506 then controls the dispatching rate of SRHs 504 according to the directive. RDM/GRH increases the buffer size of SLB/GRB, respectively, if required. GRH 502 and RDM 506 sends out positive acknowledgements to LDC 508 for successful implementations of the directive, or else negative acknowledgements are sent out to LDC 508.

Due to resource manager's messages or due to some other reason (e.g., to counter frequent overflow of an SLB or GRB), LDC 508 might decide to change (increase/decrease) the size of any of the buffers. To change the size of GRB, LDC 508 directs GRH 502. GRH 502 implements the directive and sends a positive response upon successful change or else a negative response. To change the size of an SLB or to change the dispatching rate of an SRH, LDC 508 directs RDM 506 informing it about the action required for the specific request class. RDM 506 implements the action in the directive and sends a positive response upon successful change or else a negative response.

As and when the resource manager adds a new request class r, it notifies LDC 508 of a CLD regarding the update. The update will also contain the possible QoS/SLA parameters and/or possible maximum request rate. LDC directs RDM to create a new SRH for r and add r to its list of request classes. RDM creates an SRH with specific SLB size (as specified by LDC). RDM then sends a message to LDC informing about the successful SRH creation. If RDM cannot create an SRH, it sends a negative response to LDC. Upon receiving a positive reply from RDM, LDC directs GRH for change in GRB size and addition of new request class r. GRH implements LDC directive by increasing GRB size and updating its list of request classes. GRH sends a positive acknowledgement upon successful completion. If GRH fails, then it sends a negative response.

If any kind of fault at GRH/LDC/RDM did not allow the load balancer to effectively add request class r to load balancer, then LDC may send a negative response to resource manager.

Similarly for removal of a request class r, LDC sends a directive to RDM to remove the corresponding SRH. RDM upon receiving such a directive, sends a control message to GRH saying "removing SRH for request r". GRH then, stops receiving any further requests for r from outside, forwards all requests of r to the SRH. Then GRH sends an acknowledgement to RDM. Upon receiving the acknowledgement from GRH, RDM waits till SLB for r becomes empty (there is no more request to be dispatched) and then removes the SRH. Then it sends an acknowledgment to LDC. LDC then directs GRH to change the size of GRB and to remove request class r from its records, as appropriate. GRH changes the size of GRB, updates the list and then sends a positive response to LDC. Upon receiving positive responses from both GRH and RDM, LDC then might send an acknowledgement containing "request class r has been removed" to RM, if required. If any kind of fault at GRH/LDC/RDM did not allow the load balancer to effectively remove request class r, then LDC may send a negative response to resource manager.

Requests of each request class are dispatched concurrently with requests of other request classes. While the CLD uses parallel dispatching in order to ensure that no two dispatchers send requests to the same instance at a time, each logical instance should belong to only one resource class. It can be recalled that a logical instance is either a physical instance/replica or some capacity of a physical instance/replica in a cluster. For example, if request classes are Gold and Silver, a logical instance would belong to either of Gold and Silver, but not both.

In an alternate embodiment, sequential dispatching technique can also be employed for this architecture. Instead of parallel dispatching, sequential dispatching can be implemented using the following technique. Request Dispatcher of each SRH are removed. In place of these request dispatchers, a single request dispatcher for all request classes is employed. This request dispatcher is responsible to carry out scheduling among the various queues based on any parameter (e.g., QoS/SLA based weight) and dispatches one request at a time.

The CLD described in implementation 1 uses dual level buffering for processing the requests. An information flow exists between the two levels of buffers. This helps in identifying the probability of a request being accepted at the second level. As a result, requests having low probability of survival are dropped out at the first level, thereby reducing the wastage of system resources (such as memory availability and processing power).

The CLD also carries out differentiated load balancing of requests thereby resulting in strict enforcement of QoS/SLA.

Each SRH dispatches a request directly to the target component. Hence a parallel dispatch of request takes place. There is no bottleneck through which the request would have to pass through before being finally dispatched to the target component. This increases the throughput of the CLD.

The number of requests that are dropped in the CLD are reduced as the system resources are more efficiently used. Hence the requests that are forwarded to the second level are only those that have a high probability of survival, or high utility of forwarding. This is achieved by flow control between levels in the CLD architecture.

Implementation: A CLD can be implemented using Object-Oriented Technologies. For example, C++ is used to implement the system. Each module/entity has an associated class: Buffer, Queue, GRH, SRH, LDC, RDM, RD. SLB and GRB are subclasses of Buffer. Object messaging is used among objects of these classes to carry out communication. A CLD contains objects for one GRH, a number of SRH, one RDM and one LDC. Each GRH contains an object GRB. Each SRH contains an object for SLB and RD. Each RDM has associative relationships with each SRH. Each LDC contains a list of previous-level load balancers and next-level load balancers. RDM has associations with load balancers.

In another implementation, CLD is an IC and/or a logic circuit with the following components: LDC as a microprocessor Intel x86, RDM as another microprocessor Intel x86, RD as an Intel x86, GRH comprising of DRAM memory for GRB. SLB is also implemented as DRAM memory. Standard network cards/interfaces can be used for I/O for receiving requests and sending requests, communication of flow control messages. Protocol of communication among load balancers can be TCP/IP.

Implementation-2: Framework for Cooperative Load Balancing

The model described in conjunction with FIG. 1 is implemented in a multi-level processing system (framework); each load balancer (scheduler) at the front of a cluster can be modeled as a queue. The processing function of such a queue is a dispatching function. There may be one or more clusters associated with each queue. The functionalities of sensing module, implementing module and exchanging module is carried out by LDC 508 in each load balancer (CLD 500). CLD 500 as described above in conjunction with FIG. 5 is used in such multiple level processing systems (framework) as shown in FIG. 6.

We now briefly describe the environment in which this framework is employed. A centralized system employing cooperative load balancing framework involves a set of replicas of the system. These replicas are load balanced for incoming requests. A distributed system employing cooperating load balancing framework involves clusters of its components. Replicas of the whole system are not used. Cluster of replicas of a component is used. Each cluster contains replicas of one component. A load balancer associated with a cluster, distributes load among the replicas in that cluster. In order to reduce request drops at intermediate clusters, flow control is employed among load balancers across clusters (FIG. 6).

Figure 6:
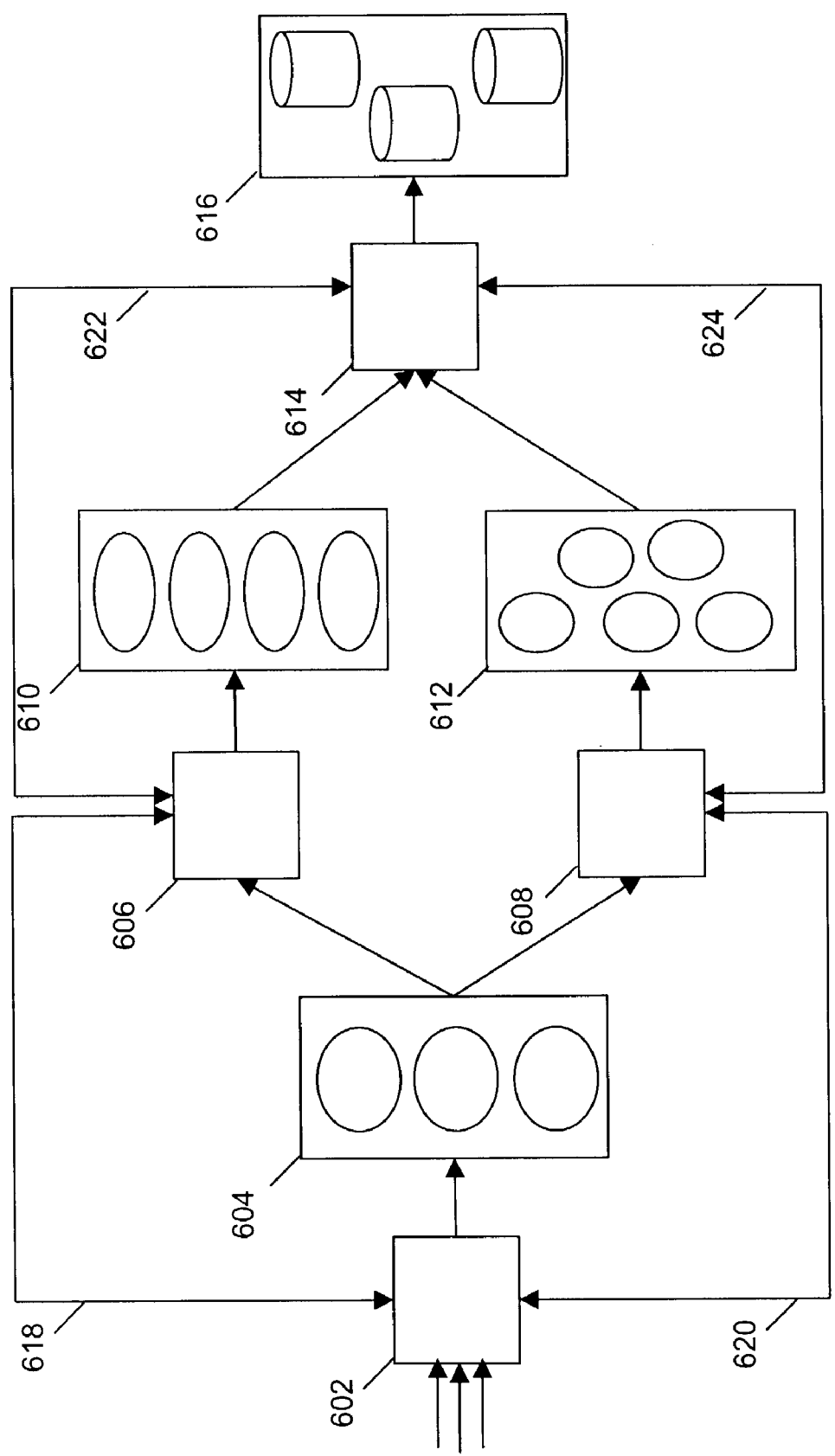
FIG. 6 shows a cooperative load balancing framework that is based on the idea of flow of information amongst CLDs as described in FIG. 5.

An example of cooperative load balancing framework (based on model described in FIG. 1) is now described in conjunction with FIG. 6. Note that there may be numerous variations of the cooperative load balancing framework that use CLD 500 without deviating from the spirit and scope of the invention.

The CLDs used in the framework have the architecture of CLD 500 in order to carry out the functionalities of sensing module, implementing module and exchanging module. The framework in this example includes a CLD 602, a CLD 606, a CLD 608 and a CLD 614 (each having system architecture of CLD 500) that distribute requests to components in a cluster 604, a cluster 610, a cluster 612 and a cluster 616, respectively. Information (or message) 618 is exchanged between CLD 606 and CLD 602, while information 620 is exchanged between CLD 608 and CLD 602. Similarly, information 622 is exchanged between CLD 614 and CLD 606, while information 620 is exchanged between CLD 614 and CLD 608.

A request to the load balancing framework goes to CLD 602 and is distributed to one of the front-end components of cluster 604. After processing by the front-end component, the request may either go to CLD 606 (controlling cluster 610 of server application A) or CLD 608 (controlling cluster 612 of server application B), depending on subsequent processing requirements of the request. After this processing, the request is sent to CLD 614, which distributes the request among databases in cluster 616 for completing the processing of the request. The flow of request to various clusters is governed by flow of information between CLDs.

We now describe how CLD 500 can be used in the above described cooperative load balancer framework. As already described, each CLD 500 has LDC 508, which enables CLD 500 to generate and exchange messages with other CLDs in the framework. Thus, in this implementation, LDC 508 acts as the sensing module as well as the generating module of CLD 500 (which acts as a queue). LDC 508 also exchanges information with Load Monitors (LM). Besides the modules/components described earlier, LDC 508 also includes receivers of messages from various components and adjacent load balancers and resource manager, senders of messages to such components, a module for initialization of the system when it comes up, a module to update CLD records due to any dynamic modification in the cluster. It also has a module that modifies the configuration of CLD dynamically based on a new request class, or based on any change in the request handling capacity of the cluster. In short, LDC 508 is responsible to manage the whole LDC system and apply flow control among load balancers across clusters.

As and when buffer of GRH 502 becomes near-full (due to high request dispatch rate of a previous level CLD, for instance), GRH sends a control message to LDC about the state. This message contains, relevant data and may include incoming request rate, request classifying rate, request dispatching rate etc. LDC then decides whether to increase the buffer sizes of GRB and/or to send a flow control message to its previous-level CLDs.

LDC 508 is responsible to decide, when to generate and send flow control messages to its previous-level load distributors. When GRH is near-full, LDC may send a flow control message to GRH. GRH increases the buffer size of GRB, if required. GRH sends out positive acknowledgements to LDC for successful implementations of the directive, or else negative acknowledgements are sent out to LDC. Upon successful implementation of a flow control directive, LDC sends out its new dispatching rate of request class r to all its next-level distributors. Such CLDs, upon receiving the message, update their records.

As and when, there is significant increase in the capacity of SLB or capacity (in terms of request rate) of some instance(s) in the cluster for request class r, LDC will notify the previous level load balancers about the increase in capacity, projected (due to increase in capacity) maximum request rate that it can handle, its current dispatching rate for r, its current incoming request for r etc. LDC will notify only if it has recently sent a flow control message to its previous load balancers for request class r. As soon as an LDC of the previous level CLD receives such a message, it computes how much increase d is possible in its request dispatching rate for r. Then LDC of the previous level CLD directs GRH and/or RDM to increase its dispatching rate of r.

As and when, the resource manager adds a new request class r, it notifies LDC of a CLD regarding the update. The update will also contain the possible QoS/SLA parameters and/or possible maximum request rate. Request rate for class r, to front-end cluster is the aggregate request rate from all end-users of request class r at a given point. But each request of class r in a front-end cluster may generate more than one requests for next clusters. So for each cluster, there is possibly a different incoming request rate. LDC decides upon the possible changes to GRB size and possible size of SLB for r. LDC first directs RDM to make appropriate changes to SLB (as described earlier). Upon receiving a positive reply from RDM, LDC directs GRH for change in GRB size and addition of new request class r. GRH implements LDC directive by increasing GRB size and updating its list of request classes. GRH sends a positive acknowledgement upon successful completion. If GRH fails, then it sends a negative response.

Similarly for removal of a request class r, LDC decides about the possible change in GRB size. It sends a directive to RDM to remove appropriate SRH. Upon positive response from RDM, LDC directs GRH to change the size of GRB and to remove request class r from its records, as appropriate. GRH changes the size of GRB, updates the list and then sends a positive response to LDC. Upon receiving positive responses from both GRH and RDM, LDC may send an acknowledgement containing "request class r has been removed" to RM, if required. If any kind of fault at GRH/LDC/RDM did not allow the load balancer to effectively remove request class r, then LDC might send a negative response to resource manager, if necessary.

Figure 7:
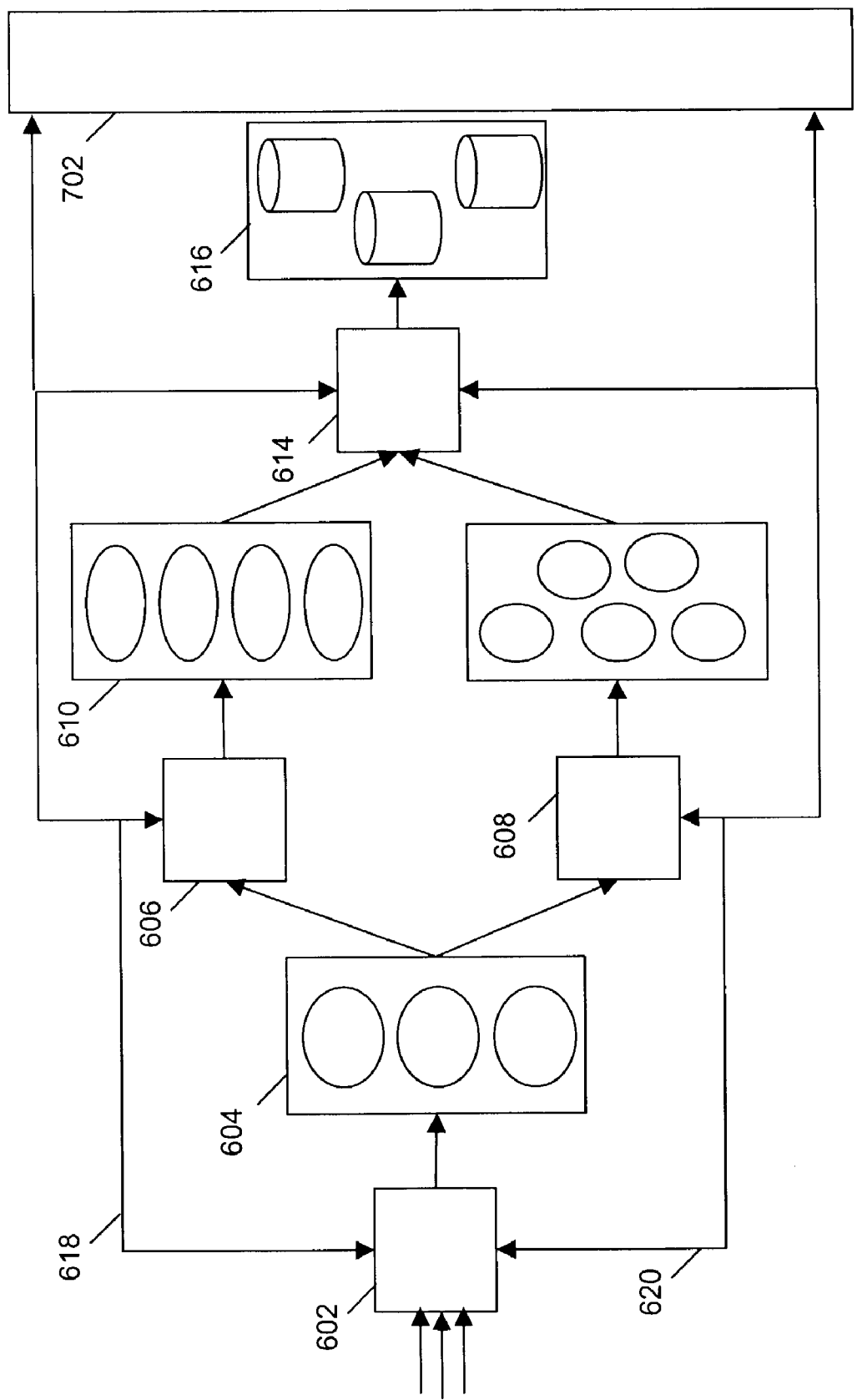
FIG. 7 shows another cooperative load balancing framework that is based on the idea of flow of information amongst load balancers.

In an alternate embodiment, centralized flow control among inter-cluster load balancers can also be employed (as shown in FIG. 7). In this embodiment, instead of having a LDC for each CLD, there can be one (or more) centralized LDC 702 which carry out flow control in a centralized manner. An important functionality of this centralized LDC 702 includes flow control. Some of the functionalities of LDC, including implementing resource manager allocations plans, directing RDM to create or remove a RD, receiving control messages from GRH and RDM, initializing the CLD during startup, can be carried out at by an entity (for example, a partial LDC) local to each load distributor. The corresponding load balancing framework is shown in FIG. 7.

The proposed framework for load balancing facilitates load balancing on per cluster basis and flow control among inter-cluster load balancers. The system of cooperative load distributor (CLD) carries out distributed flow control among inter-cluster load balancers. A cooperative load distributor accounts for dynamic allocation and de-allocation of instance capacity to customer(s) by resource managers, if any in the system. It also uses dynamic load information collected by load monitors, if any in the system, to effectively balance load. CLD dynamically determines whether to send any control message to previous-level CLDs on the basis of the current incoming request rate per customer and request dispatching rate per customer and/or capacity allocation/de-allocation or based on any other system state.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for scheduling requests being processed in a multi-level computing system, each level of the computing system having at least one queue, each queue having at least one processing function associated therewith, said method comprising the steps of:
    buffering the requests in said at least one queue of a first level of said computing system;
    exchanging a flow of information with other levels adjacent to the first level;
    determining a probability that a particular request will survive processing at a next-level queue with respect to a first level queue based on (i) said flow of information exchanged between queues, and (ii) a processing load on said next-level queue, wherein each queue in a particular level is operable to send flow control signals to a previous-level queue and send control signals to a next-level queue;
    obtaining a classification value of said requests based on said probability and a classification standard of said requests;
    comparing the obtained classification value to a threshold classification value;
    scheduling said requests for processing when said obtained classification value exceeds said threshold classification value;
    modifying said obtained classification value when said obtained classification value is less than said threshold classification value; and
    scheduling said requests for processing based on the modified obtained classification value.

2. The method of claim 1, wherein the step of scheduling comprises dispatching said requests.

3. The method of claim 1, wherein the step of scheduling comprises classifying said requests.

4. The method of claim 1, wherein the step of scheduling comprises dropping said requests.

5. The method of claim 1, further comprising the step of processing said requests at the first level if an obtained classification value is greater than a predefined value.

6. The method of claim 1, wherein the step of obtaining the classification value comprises the steps of:

calculating a utility value on the basis of an exchanged flow of information;
    assuming a corrective action executed by said at least one queue if a calculated utility value is less than a predefined value; and
    recalculating the utility value after considering the assumed corrective action.

7. The method of claim 6, further comprising:
    taking the assumed corrective action if the recalculated utility value is greater than the predefined value; and
    processing the request at the first level after taking the assumed corrective action.

8. The method of claim 6, wherein the step of assuming a corrective action comprises the step of assuming an increase in request handling capacity of an appropriate queue if an appropriate queue cannot accept said requests being processed in said multi-level computing system.

9. The method of claim 6, wherein the step of assuming a corrective action comprises the step of assuming a reduction in request dispatch rate from an appropriate queue if a queue at the next-level cannot accept said requests being processed in said multi-level computing system.

10. A system operable for scheduling a request being processed in a multi-level computing system, each level of the computing system having at least one queue, each queue having at least one processing function associated therewith, the system comprising:
    a first unit operable for:
        exchanging a flow of information between a first level and other levels adjacent to the first level; and
        determining a probability that a particular request will survive processing at a next-level queue with respect to a first level queue based on (i) said flow of information exchanged between queues, and (ii) a processing load on said next-level queue, wherein each queue in a particular level is operable to send flow control signals to a previous-level queue and send control signals to a next-level queue;
    a second unit operable for:
        obtaining a classification value of said requests based on said probability and a classification standard of said requests; and
        comparing the obtained classification value to a threshold classification value;
    a third unit operable for scheduling said requests for processing when said obtained classification value exceeds said threshold classification value; and
    a fourth unit operable for modifying said obtained classification value when said obtained classification value is less than said threshold classification value,
    wherein said third unit is further operable for scheduling said requests for processing based on the modified obtained classification value.

11. The system of claim 10, wherein the third unit further comprises a device operable for dispatching the request.

12. The system of claim 10, wherein the third unit further comprises a device operable for classifying the request.

13. The system of claim 10, wherein the third unit further comprises a device operable for dropping the request.

14. The system of claim 10, further comprising a processor operable for processing the request at the first level if an obtained classification value is greater than a predefined value.

15. The system of claim 10, wherein the second unit comprises:
    a first calculator operable for calculating a utility value on a basis of the exchanged flow of information;

a second calculator operable for recalculating the utility value after considering an assumed corrective action; and a component operable for taking the assumed corrective action if a recalculated utility value is greater than a predefined value.

16. The system of claim 15, wherein the component comprises a sub-component operable for reducing a request dispatch rate of a first level queue if a second level queue cannot accept extra requests.

17. The system of claim 15, wherein the component comprises a sub-component operable for increasing request handling capacity of a second level queue if the second level queue cannot accept extra requests.

18. A program storage device readable by computer, tangibly embodying a program of instructions executable by said computer to perform a method for scheduling requests being processed in a multi-level computing system, each level of the computing system having at least one queue, each queue having at least one processing function associated therewith, said method comprising the steps of:
buffering the requests in said at least one queue of a first level of said computing system;
exchanging flow of information with other levels adjacent to the first level;
determining a probability that a particular request will survive processing at a next-level queue with respect to a first level queue based on (i) said flow of information exchanged between queues, and (ii) a processing load on said next-level queue, wherein each queue in a particular level is operable to send flow control signals to a previous-level queue and send control signals to a next-level queue;
obtaining a classification value of said requests based on said probability and a classification standard of said requests;
comparing the obtained classification value to a threshold classification value;
scheduling said requests for processing when said obtained classification value exceeds said threshold classification value;
modifying said obtained classification value when said obtained classification value is less than said threshold classification value; and
scheduling said requests for processing based on the modified obtained classification value.

19. An apparatus suitable for load balancing in a computing system, said apparatus comprising:
a plurality of queues comprising:
a first level queue for buffering incoming requests;
a plurality of subsequent level queues, wherein each subsequent level of queues corresponds to a particular class of incoming requests;
a classifier operable for classifying the requests into a plurality of subsequent level queues based on user defined parameters;
an exchanger operable for exchanging information amongst the plurality of levels of queues, wherein each queue is operable for determining a probability that a particular request will survive processing at a next-level queue with respect to a first level queue based on (i) said flow of information exchanged between queues, and (ii) a processing load on said next-level queue, wherein each queue in a particular level is operable to send flow control signals to a previous-level queue and send control signals to a next-level queue;
a calculator operable for:
obtaining a classification value of said requests based on said probability and a classification standard of said requests; and
comparing the obtained classification value to a threshold classification value;
a dispatcher operable for scheduling said requests when said obtained classification value exceeds said threshold classification value; and
a sensing module operable for modifying said obtained classification value when said obtained classification value is less than said threshold classification value.
wherein said dispatcher is further operable for (i) scheduling said requests for processing based on the modified obtained classification value, and (ii) dispatching the scheduled requests from the queues to at least one of the queues or target components.

20. The apparatus of claim 19, wherein the dispatcher comprises a unit operable for parallel dispatching of requests.

21. The apparatus of claim 19, wherein the exchanger further comprises a controller operable for controlling a dispatch rate of requests from the queues.

22. The apparatus of claim 19, wherein the requests are classified at the first level queue on the basis of Qos and SLA and information from the subsequent level queues.

23. A method of performing load balancing in a computing system, said method comprising:
providing a plurality of queues, said plurality of queues comprising:
a first level queue for buffering incoming requests;
a plurality of subsequent level queues, each subsequent level of queues corresponding to a class of incoming request;
classifying the requests into a plurality of classes based on user defined parameters;
exchanging information amongst a plurality of levels of queues;
determining a probability that a particular request will survive processing at a next-level queue with respect to a first level queue based on (i) said flow of information exchanged between queues, and (ii) a processing load on said next-level queue, wherein each queue in a particular level is operable to send flow control signals to a previous-level queue and send control signals to a next-level queue;
obtaining a classification value of said requests based on said probability and a classification standard of said requests;
comparing the obtained classification value to a threshold classification value;
scheduling said requests for processing when said obtained classification value exceeds said threshold classification value;
modifying said obtained classification value when said obtained classification value is less than said threshold classification value;
scheduling said requests for processing based on the modified obtained classification value; and
dispatching the scheduled requests from the queues to at least one of the queues or target components.

24. A system operable for scheduling requests in a computing system, said system comprising:
a plurality of clusters; and
a plurality of load balancers, wherein each load balancer corresponds to at least one cluster and comprises:
a first unit operable for receiving a request;
a second unit operable for:

exchanging information from adjacent level load balancers; and determining a probability that a particular request will survive processing at a next-level queue with respect to a first level queue based on (i) said flow of information exchanged between queues, and (ii) a processing load on said next-level queue, wherein each queue in a particular level is operable to send flow control signals to a previous-level queue and send control signals to a next-level queue;

a third unit operable for:

obtaining a classification value for said request based on said probability and a classification standard of said requests; and comparing the obtained classification value to a threshold classification value;

a fourth unit operable for scheduling said requests for processing when said obtained classification value exceeds said threshold classification value; and a fifth unit operable for modifying said obtained classification value when said obtained classification value is less than said threshold classification value, wherein said fourth unit is further operable for (i) scheduling said requests for processing based on the modified obtained classification value, and (ii) dispatching the scheduled requests from the queues to at least one of the queues or target components.

25. A method for scheduling requests in a network, the network comprising a plurality of load balancers, said method comprising:

receiving a request at a first level load balancer;

exchanging information for the request with adjacent level load balancers;

determining a probability that a particular request will survive processing at a next-level queue with respect to a first level queue based on (i) said flow of information exchanged between queues, and (ii) a processing load on said next-level queue, wherein each queue in a particular level is operable to send flow control signals to a previous-level queue and send control signals to a next-level queue;

obtaining a classification value of said requests by processing the exchanged information and based on said probability and a classification standard of said requests;

comparing the obtained classification value to a threshold classification value;

scheduling said requests for processing when said obtained classification value exceeds said threshold classification value;

modifying said obtained classification value when said obtained classification value is less than said threshold classification value; and scheduling said requests for processing based on the modified obtained classification value.

26. The method of claim 25, wherein the step of processing the exchanged information comprises:

determining a threshold utility value of forwarding the request;

obtaining a utility value of forwarding the request;

comparing the utility value and the threshold utility value; and taking corrective actions if utility value is less than the threshold utility value.

27. The method of claim 26, wherein the step for determining the threshold value for utility further comprises:

identifying the Qos and SLA requirements that a network needs to serve; and determining resources allocated to the requests in the network.

28. The method of claim 26, wherein the step for obtaining the utility value comprises:

identifying QoS and SLA relevant to the request from a request header;

determining allocated resources corresponding to the request at a subsequent level balancer; and processing identified and determined information to obtain the utility value.

29. The method of claim 26, wherein the step for taking corrective actions comprises lowering a request dispatch rate at the load balancer.

30. The method of claim 26, wherein the step for taking corrective actions comprises increasing the load balancer capacity to accept extra load, wherein increasing the load balancer capacity increases the utility value for the request.

31. A method for scheduling requests in a computer network, said method comprising:

receiving a request at a first level load balancer;

exchanging information for the request with adjacent level load balancers;

determining a probability that a particular request will survive processing at a next-level queue with respect to a first level queue based on (i) said flow of information exchanged between queues, and (ii) a processing load on said next-level queue, wherein each queue in a particular level is operable to send flow control signals to a previous-level queue and send control signals to a next-level queue;

obtaining a classification value of said requests based only on said probability and a classification standard of said requests;

comparing the obtained classification value to a threshold classification value;

scheduling said requests for processing when said obtained classification value exceeds said threshold classification value;

modifying said obtained classification value when said obtained classification value is less than said threshold classification value: and scheduling said requests for processing based on the modified obtained classification value.

* * * * *